(12) United States Patent
Skillin et al.

(10) Patent No.: US 9,523,596 B2
(45) Date of Patent: Dec. 20, 2016

(54) AUTO-REFILL SINGLE DOSE DISPENSER

(71) Applicant: MWV SLATERSVILLE, LLC, Slatersville, RI (US)

(72) Inventors: Clifford Skillin, Blackstone, MA (US); Patrick Brannon, Warwick, RI (US)

(73) Assignee: WestRock Slatersville, LLC, Norcross, GA (US)

( * ) Notice: Subject to any disclaimer, the term of this patent is extended or adjusted under 35 U.S.C. 154(b) by 118 days.

(21) Appl. No.: 14/378,122

(22) PCT Filed: Feb. 14, 2013

(86) PCT No.: PCT/US2013/026043
§ 371 (c)(1),
(2) Date: Aug. 12, 2014

(87) PCT Pub. No.: WO2013/123123
PCT Pub. Date: Aug. 22, 2013

(65) Prior Publication Data
US 2015/0028063 A1 Jan. 29, 2015

Related U.S. Application Data

(60) Provisional application No. 61/598,749, filed on Feb. 14, 2012.

(51) Int. Cl.
*G01F 11/26* (2006.01)
*G01F 11/28* (2006.01)

(52) U.S. Cl.
CPC ............. *G01F 11/28* (2013.01); *G01F 11/261* (2013.01); *G01F 11/262* (2013.01)

(58) Field of Classification Search
CPC ....... G01F 11/261; G01F 11/28; G01F 11/262; G01F 11/26; G01F 11/263; A47G 19/34; B65D 25/25
See application file for complete search history.

(56) References Cited

U.S. PATENT DOCUMENTS

| 1,498,491 A | * | 6/1924 | Stinson | A47G 19/34 222/189.02 |
| 1,568,923 A | * | 1/1926 | Ruiz | A47G 19/34 222/455 |

(Continued)

FOREIGN PATENT DOCUMENTS

| EP | 0343638 A1 | 11/1989 |
| FR | 2590555 A1 | 5/1987 |

(Continued)

*Primary Examiner* — Patrick M Buechner
*Assistant Examiner* — Randall Gruby
(74) *Attorney, Agent, or Firm* — WestRock Intellectual Property Group

(57) ABSTRACT

A single dose dispenser for dispensing product from a container is disclosed. The dispenser includes a body portion having skirt configured to couple to a container. A top is connected to the body portion that has a dispensing orifice formed therethough. A middle deck extends across an interior of the body portion forming a storage chamber between the top, inner surface of the body portion and the middle deck for temporarily holding product therein from the container. A cap is connected to the upper deck to selectively seal the dispensing orifice. A reservoir chamber depends from the middle deck for temporarily receiving product from the storage chamber. A flow conduit extends upwards from the middle deck up to the dispensing orifice and downwards into the reservoir chamber for dispensing product from the reservoir chamber.

9 Claims, 4 Drawing Sheets

(56) References Cited

U.S. PATENT DOCUMENTS

| | | | | |
|---|---|---|---|---|
| 1,859,109 | A | * | 5/1932 | Oswell .................. A47G 19/34 222/455 |
| 1,962,562 | A | * | 6/1934 | Hemman .............. G01F 11/261 222/173 |
| 2,091,929 | A | | 8/1937 | Kappenberg |
| 2,243,452 | A | * | 5/1941 | Bickel .................. G01F 11/261 222/455 |
| 2,584,130 | A | * | 2/1952 | Huebl .................. G01F 11/262 222/455 |
| 2,739,741 | A | | 3/1956 | Barnett |
| 2,760,692 | A | * | 8/1956 | Buehlig ................ G01F 11/262 222/434 |
| 2,803,270 | A | * | 8/1957 | Carbone, Jr. ......... G01F 11/262 141/322 |
| 2,899,115 | A | * | 8/1959 | Matter .................. G01F 11/261 222/438 |
| 2,977,028 | A | * | 3/1961 | Joffe .................... G01F 11/262 222/442 |
| 3,023,937 | A | * | 3/1962 | Matter .................. A47G 19/34 222/440 |
| 3,107,031 | A | * | 10/1963 | Adams ................. G01F 11/262 215/386 |
| 3,235,143 | A | * | 2/1966 | Goodrich .............. B65D 5/76 222/454 |
| 3,288,335 | A | | 11/1966 | Steffens et al. |
| 3,402,860 | A | * | 9/1968 | Torongo, Jr. .......... G01F 11/262 222/207 |
| 3,451,446 | A | * | 6/1969 | Russell ................. G01F 11/262 141/319 |
| 4,015,758 | A | | 4/1977 | Cavazza |
| 4,763,817 | A | | 8/1988 | Lee |
| 4,830,226 | A | * | 5/1989 | Kong .................. B67D 7/0216 222/205 |
| 5,029,736 | A | | 7/1991 | Maruyama et al. |
| 5,129,561 | A | * | 7/1992 | Drobish ................ G01F 11/262 222/455 |
| 5,143,261 | A | * | 9/1992 | Drobish ............. B65D 81/3216 222/129 |
| 5,356,053 | A | * | 10/1994 | Di Fatta ................ B65D 25/52 222/207 |
| 5,392,966 | A | * | 2/1995 | Bunin .................. G01F 11/268 222/434 |
| 5,397,027 | A | * | 3/1995 | Koch .................... G01F 11/262 222/1 |
| 5,407,104 | A | * | 4/1995 | Santagiuliana ....... G01F 11/263 222/425 |
| 5,467,903 | A | * | 11/1995 | Sorensen .............. G01F 11/261 222/455 |
| 5,480,071 | A | | 1/1996 | Santagiuliana |
| 5,487,494 | A | | 1/1996 | Robbins, III |
| 5,495,964 | A | | 3/1996 | Santagiuliana |
| 5,556,011 | A | * | 9/1996 | Jennings ................ B65D 83/06 141/325 |
| 5,667,094 | A | | 9/1997 | Rapchak et al. |
| 5,927,354 | A | * | 7/1999 | Flewitt .................. G01F 11/262 141/322 |
| 6,076,708 | A | | 6/2000 | Ceccarelli et al. |
| 6,290,102 | B1 | * | 9/2001 | Jennings ............... G01F 11/262 222/158 |
| 2002/0070230 | A1 | * | 6/2002 | Vollrath ................ G01F 11/262 222/1 |
| 2003/0164203 | A1 | * | 9/2003 | Moreau ................ G01F 11/262 141/375 |
| 2004/0173634 | A1 | * | 9/2004 | Pagovich ............. G01F 11/262 222/158 |
| 2005/0087567 | A1 | | 4/2005 | Nielsen et al. |
| 2006/0091153 | A1 | * | 5/2006 | Evans ..................... G01F 11/26 222/1 |
| 2006/0144872 | A1 | * | 7/2006 | Israel ................... G01F 11/261 222/454 |
| 2007/0080180 | A1 | * | 4/2007 | Ceccarelli ............. G01F 11/262 222/456 |
| 2009/0159620 | A1 | | 6/2009 | Nielsen |
| 2010/0147903 | A1 | * | 6/2010 | Farside ................. G01F 11/262 222/454 |
| 2011/0127297 | A1 | * | 6/2011 | Jennings .............. B65D 1/0223 222/158 |
| 2011/0266311 | A1 | | 11/2011 | Nielsen |
| 2011/0284590 | A1 | | 11/2011 | Brannon et al. |
| 2012/0248153 | A1 | * | 10/2012 | Peng ..................... G01F 11/262 222/454 |
| 2013/0168418 | A1 | * | 7/2013 | Druyan .............. A47G 19/2266 222/454 |
| 2013/0270304 | A1 | * | 10/2013 | Szekely ............... B65D 47/268 222/452 |
| 2014/0197209 | A1 | * | 7/2014 | Debski .................. B65D 25/52 222/454 |

FOREIGN PATENT DOCUMENTS

| | | |
|---|---|---|
| GB | 497199 | 5/1937 |
| GB | 628091 | 8/1949 |
| GB | 2145061 A | 3/1985 |
| WO | 9108979 | 6/1991 |
| WO | 9713123 A1 | 4/1997 |
| WO | 2006030471 A2 | 3/2006 |
| WO | 2006072972 A2 | 7/2006 |
| WO | 2011137901 A2 | 11/2011 |

\* cited by examiner

AUTO-REFILL SINGLE DOSE DISPENSER

CROSS-REFERENCE TO RELATED APPLICATION

This application claims priority to earlier filed U.S. Provisional Application Ser. No. 61/598,749, filed Feb. 14, 2012, the contents of which are incorporated herein by reference.

BACKGROUND OF THE INVENTION

1. Field of the Invention

The present patent document relates generally to single dose dispensers for bottles and containers of pourable products, such as liquids and powders, for instance, and more particularly to an auto-refill single dose dispenser that may be injection molded in a single shot with little after-molding assembly.

2. Background of the Related Art

Single dose dispensers for containers of liquids are known in the art. However, these prior art dispensers require multiple separately molded parts that are later assembled together resulting in a dispenser that is undesirably expensive. Therefore, there is a need in the art for a single dose dispenser that can be molded in a single shot and in single piece that requires few after-molding steps to assemble.

SUMMARY OF THE INVENTION

The single dose dispenser of the present invention solves the problem of the prior art by providing a dispenser that can be molded in a single shot with little after-molding assembly. The dispenser includes a body portion having skirt configured to couple to a container. A top is connected via a living hinge to the body portion. After molding, the top is folded over onto the body portion and connected thereto in sealing engagement. The top further has a dispensing orifice formed therethough. A middle deck extends across an interior of the body portion forming a storage chamber between the top, inner surface of the body portion and the middle deck for temporarily holding product therein from the container. A cap is connected to the upper deck to selectively seal the dispensing orifice. A reservoir chamber depends from the middle deck for temporarily receiving product from the storage chamber. The reservoir chamber includes a reservoir closure member to seal the bottom of the reservoir chamber after molding. A flow conduit extends upwards from the middle deck up to the dispensing orifice and downwards into the reservoir chamber for dispensing product from the reservoir chamber.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
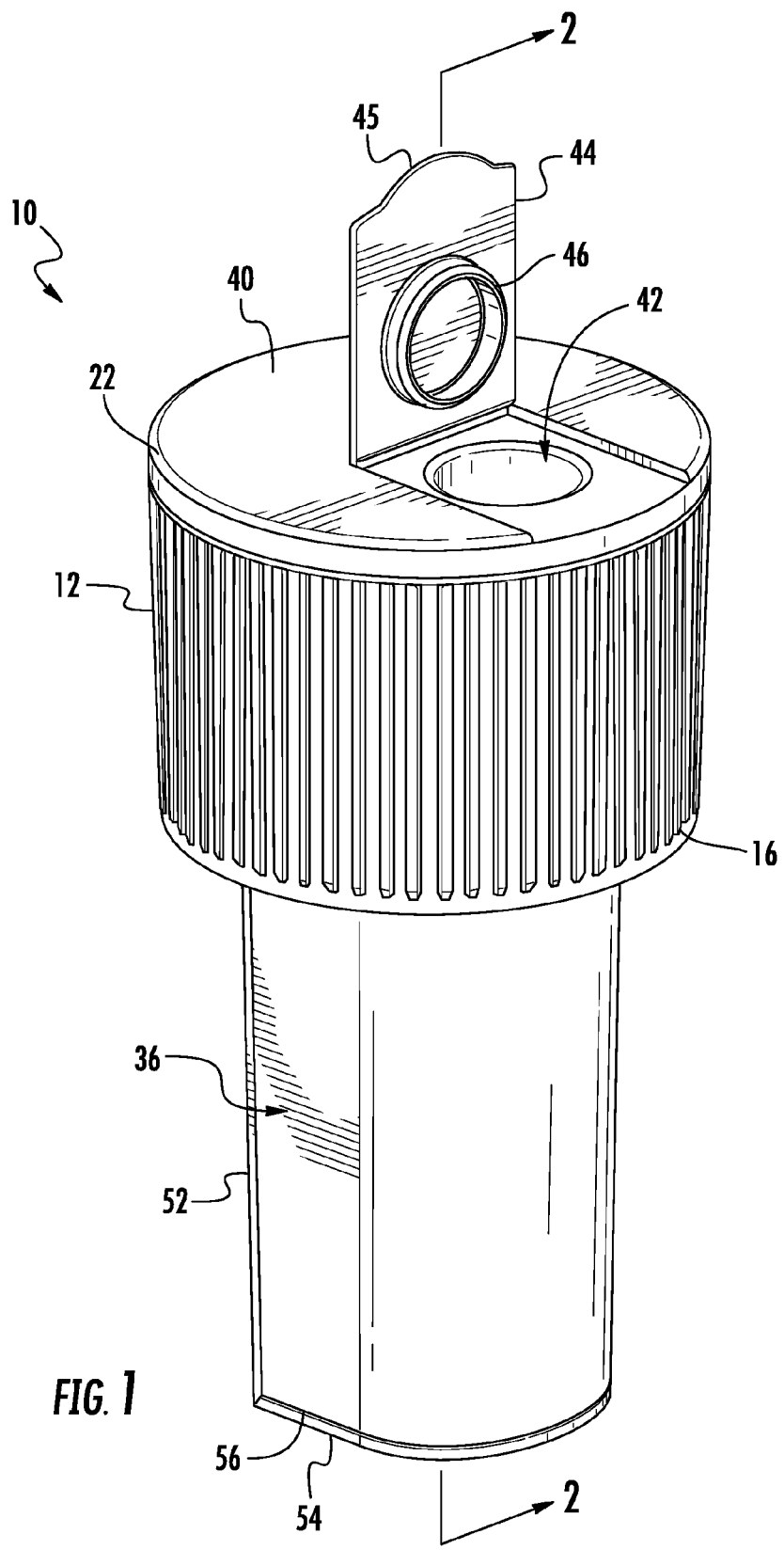
FIG. 1 is a top, rear perspective view of a single dose dispenser in an assembled state.
Figure 2:
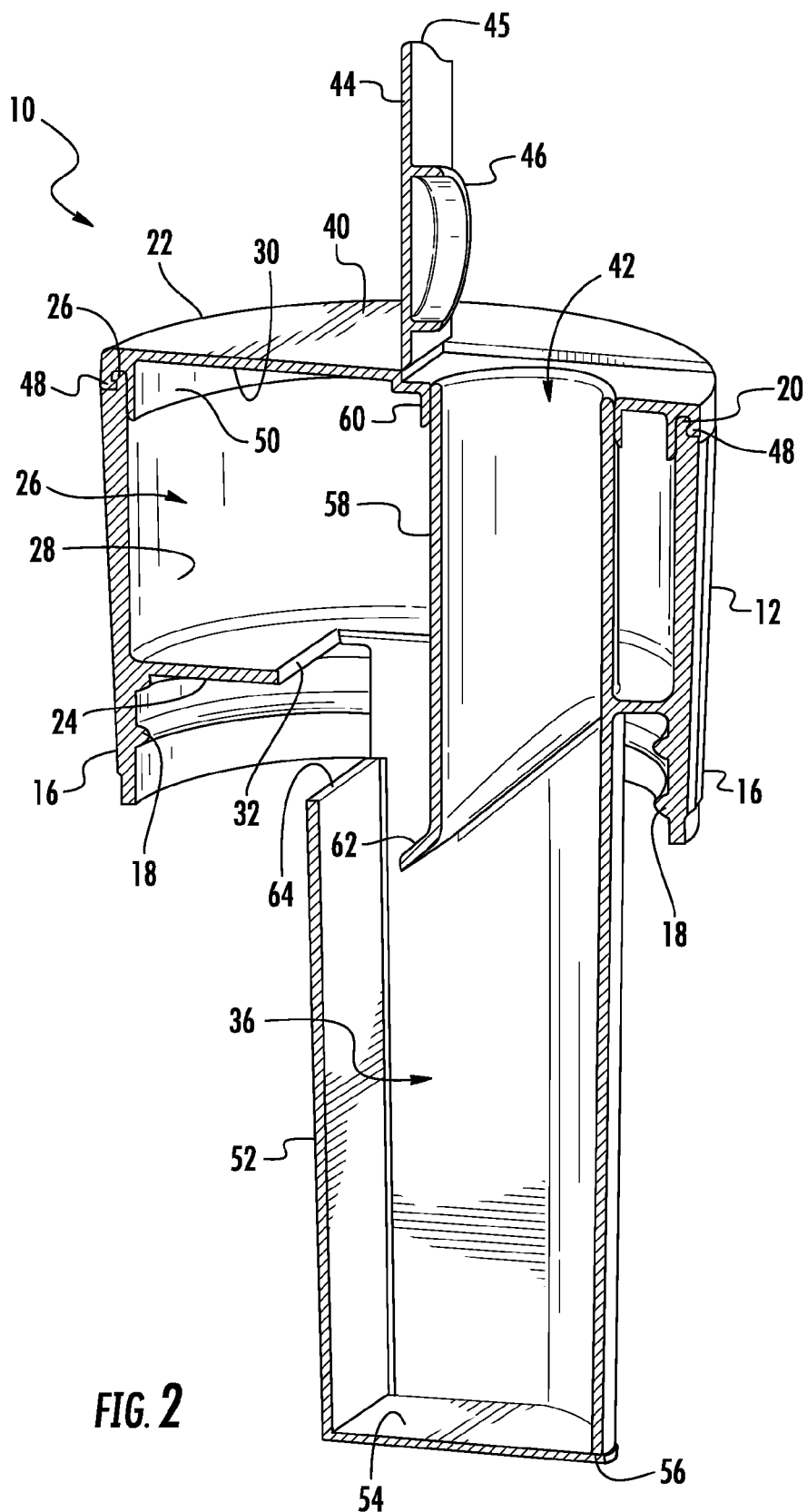
FIG. 2 is an cross-section view through line 2-2 of FIG. 1.

Referring now to FIGS. 1-4, the auto-refill single dose dispenser is shown generally at 10. In particular, the dispenser 10 is a single piece closure that is configured to attach to a product container (not shown), such as liquids, powders, pellets and pourable materials, generally.

The dispenser 10 includes a body portion 12 having a top annular edge 14 and depending skirt 16. The skirt 16 has a threaded portion 18 for threadably attaching to a neck of a product container (not shown). The outer surface of the body portion 12 and skirt 16 may include ribs or knurling to provide friction to twist the dispenser 10 onto the neck of the product container. The annular edge 14 includes mating formations 20 configured to lock a top 22 against the body portion 12, described further below. A middle deck 24 extends across the interior of the body portion 12 forming a storage chamber 26 between an inner wall 28 of the body portion 12 and an inner surface 30 of the top, described further below. An edge 32 in the middle deck 24 defines an aperture through the middle deck 24 and into the storage chamber 26, and allows the flow of product between the product container and a reservoir chamber 36, described further below.

Attached to the body portion 12 via a living hinge 38 is a top 22 that has an upper deck 40 and a dispensing orifice 42. The dispensing orifice 42 is sealable by a hinged cap 44 with an annular plug 46. The cap 44 is attached to the upper deck 40 via a living hinge, and may be opened and closed by a user via a thumb catch 45 at the terminal end of the cap 44. The top 22 includes reciprocal mating formations 48 configured to engage the mating formations 20 on the body portion 12. Also depending from the top 22 is an annular sealing wall 50 configured to engage and form a sealing surface against the inner wall 28 of the body portion 12 (best seen in FIG. 2).

A wall 52 forming the reservoir chamber 36 depends from the middle deck 24. The reservoir chamber 36 is a hollow elongate structure configured to hold a measured dose of product for dispensing from the dispenser 10. The reservoir chamber 36 has a reservoir closure member (wall) 54 depending from a bottom edge 56 of the reservoir chamber 36. After molding, the reservoir closure member 54 is folded up and sealed against the bottom edge 56 of the reservoir chamber 36 by snapping together, heat sealing, ultrasonically bonding, gluing and the like, thereby closing the open bottom end of the reservoir chamber 36.

A flow conduit 58 extends up from the middle deck 24 and, when closed, engages the throat 60 of the dispensing orifice 42, forming a continuous tubular structure. The flow conduit 58 extends downwardly from the dispensing orifice 42 of the top 22. The flow conduit 58 extends into an interior of the reservoir chamber 36. The bottom portion of the flow conduit 58 may include a lip 62 that extends downwardly and away from an axis of the dispensing orifice 42 at an angle.

The reservoir chamber 36 includes an entrance port 64 to allow product to enter the reservoir chamber 36 from the storage chamber 26 before the product exits through the flow conduit 58 and through the dispensing orifice 42.

One of the more important aspects of the invention is the ability to mold the present dispenser 10 as a single-piece. In this regard, it can be seen in FIG. 3 that the body 12, top 22, cap 44 and closure wall 54 are carefully designed so that the top 22 and closure wall 54 are formed in such a manner that they can be manipulated after molding to complete the necessary horizontal wall portions product. More specifically, it can be seen that the reservoir wall 54 which is formed in a vertical state where it can later be folded over 90 degrees the close the bottom of the reservoir chamber 36. Further the top 22 is also formed in an offset horizontal state and connected by a living hinge 38 where it can folded over 180 degrees to close the top of the storage chamber 26. By forming these structures in offset positions, the entire structure can be formed as a single piece despite the presence of internal storage reservoirs which one could not normally mold.

Figure 3:
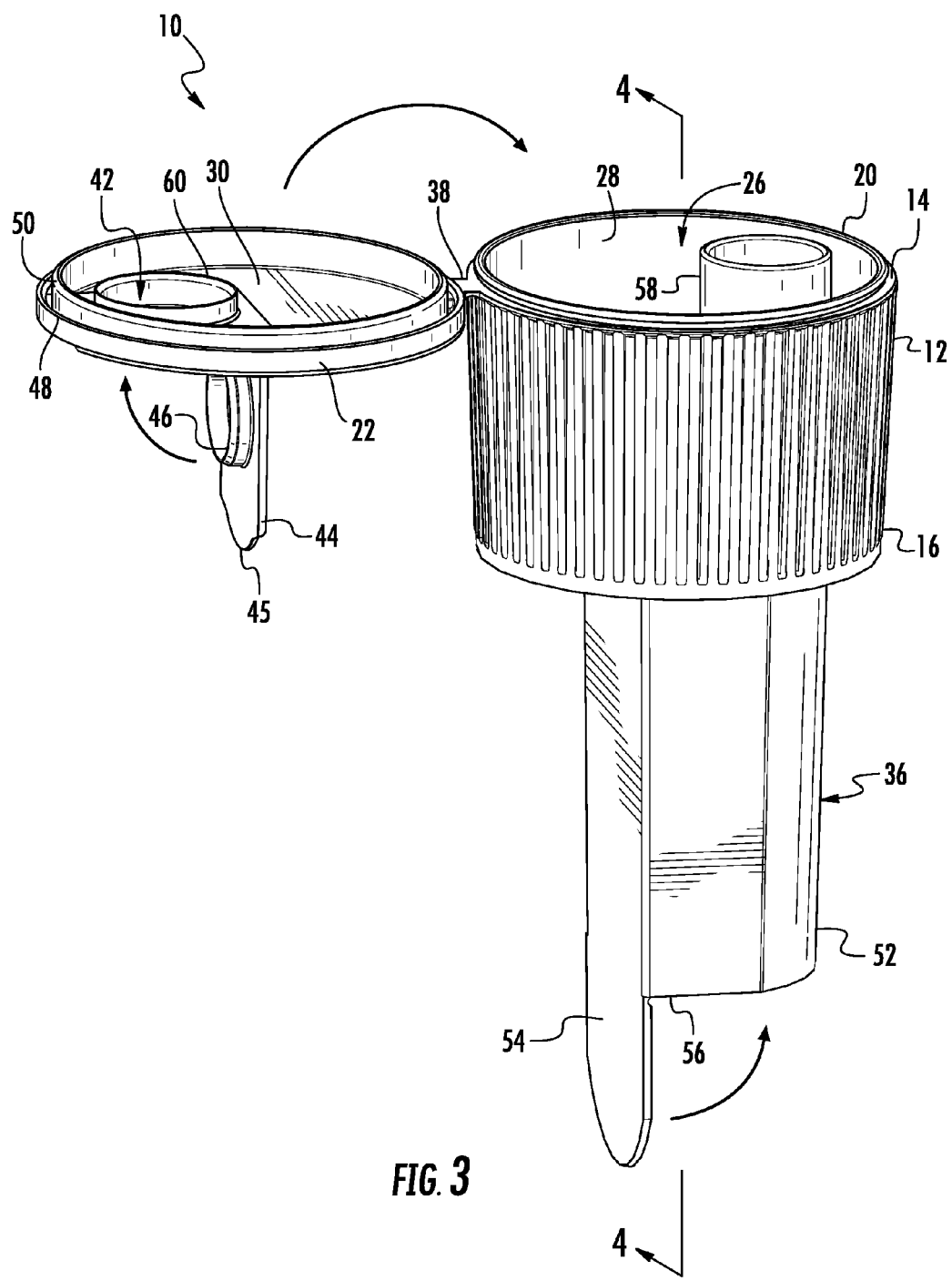
FIG. 3 is a top, front perspective view of a single dose dispenser in an unassembled state.
Figure 4:
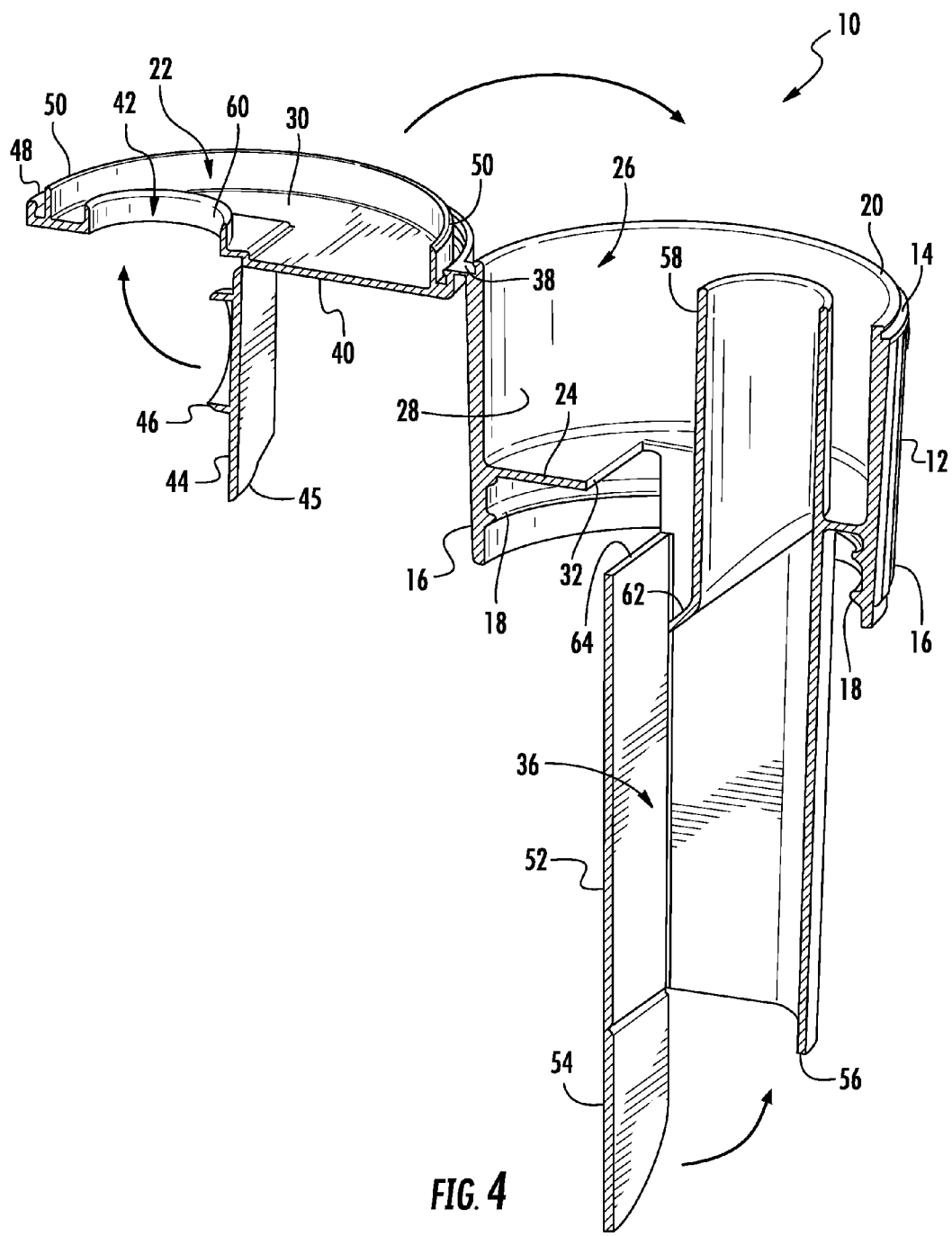
FIG. 4 is a cross-section view through line 4-4 of FIG. 3.

During molding, the dispenser 10 exits the mold in and unfolded state as substantially shown in FIGS. 3 and 4. Upon exiting the mold and the plastic is sufficiently set so it will not permanently deform, the top 22 is closed, engaging the reciprocal mating formations 28 and mating formations 20 on the body portion 12 together. The annular wall 50 forms a seal against the inner surface 28 of the body portion 12. Simultaneously, the flow conduit 58 engages the throat 60 on the dispensing orifice 42, forming a seal therewith.

In operation, the product enters the storage chamber 26 when the product container is inverted to fill the storage chamber 26 temporarily. Next, the product container is uprighted which allows the product to exit the storage chamber 26 to fill the reservoir chamber 36. When the product container is inverted again and the cap 44 is open, the product exits through the flow conduit 58 and through the dispensing orifice 42.

Generally, the method of operating the present invention occurs in the following manner.

Step 1—Initially Invert Product Container to Fill Storage Chamber 26 With Product from Product Container Step 2—Upright Product Container to Fill Reservoir Chamber 36 With Product From The Storage Chamber 26

Step 3—Invert Product Container To Allow Product To Exit Through Flow Conduit 58 from the Reservoir Chamber 36

Step 4—Open Cap 44 in the Top to Dispense

Step 5—Repeat Steps 2-4 to dispense again. Upon filling the reservoir chamber 36, the product flows into the flow conduit 58 when the container is inverted for temporary storage before exiting the dispenser 10 through the dispensing orifice 42 after the cap 44 is opened on the top 22.

Therefore, it can be seen that the present invention provides a unique solution to the problem of providing a single dose dispenser that can be molded in a single piece with minimal after-molding assembly. Consequently, the cost of the single dose dispenser may be contained within desirable manufacturing limits, yet provide the desired functionality of measuring a single dose of a product for end consumers.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A single-dose dispenser for dispensing product from a container, comprising:
   a one-piece, molded dispensing structure including
   a body portion having an inner wall and skirt, the skirt having a portion configured and arranged to couple to a container;
   a top portion connected to an annular upper edge of the body portion via a first living hinge, the top having an upper deck and dispensing orifice formed therethough;
   said body portion and said top portion having reciprocal annular mating formations depending therefrom configured and arranged to interlock together in assembled relation;
   a middle deck extending across an interior of the body portion forming a storage chamber between the top portion, the inner wall of the body portion and the middle deck for temporarily holding product therein, the middle deck in fluid communication with the container;
   said top portion having a cap connected to the upper deck via a second living hinge, said cap being configured and arranged to selectively seal the dispensing orifice;
   a reservoir chamber portion defined by a chamber wall depending downwardly from the middle deck, the reservoir chamber wall having a reservoir closure member extending from and connected to a bottom edge of said wall with a third living hinge, said closure member being configured and arranged for folding and sealing an open bottom end of the reservoir chamber portion, the reservoir chamber wall having an entrance port adjacent the middle deck, the reservoir chamber portion in fluid communication with the storage chamber through an opening in said middle deck; and
   a flow conduit extending upwards from the middle deck in fluid connection to the dispensing orifice on the upper deck of the top, the flow conduit further depending downwardly into an interior of the reservoir chamber portion;
   whereby product enters the storage chamber when the container is inverted and exits the storage chamber to fill the reservoir chamber when the container is uprighted, and the product exiting the dispensing orifice when the product container is inverted again with the cap open.

2. The dispenser of claim 1, wherein the flow conduit further includes a lip extending downwardly and away from an axis of the dispensing orifice at an predetermined angle from a bottom portion of the flow conduit.

3. The dispenser of claim 1, further comprising a threaded portion for threadably attaching the dispenser to the container.

4. The dispenser of claim 1, wherein the reciprocal annular mating formation on the top comprises an annular sealing wall depending therefrom configured and arranged to engage the inner wall of the body portion, forming a seal therewith.

5. The dispenser of claim 1, wherein the cap further comprises a plug depending from the cap configured and arranged to seal the dispensing orifice.

6. The dispenser of claim 1, wherein the flow conduit extends through the storage chamber.

7. The dispenser of claim 1, wherein the flow conduit does not directly contact the inner wall of the body portion.

8. The dispenser of claim 1, wherein the body portion includes a plurality of ribs.

9. The dispenser of claim 1, wherein the cap further comprises a thumb catch.

* * * * *